Patented Mar. 16, 1948

2,437,918

UNITED STATES PATENT OFFICE 2,437,918

METHOD OF PRODUCING PENICILLIN

Robert B. McCormack, Milltown, N. J., assignor to E. R. Squibb & Sons, New York, N. Y., a corporation of New York No Drawing. Application January 21, 1944, Serial No. 519,207

4 Claims. (Cl. 195—36)

This invention relates to the production of penicillin, an antimicrobial agent which has been found exceptionally effective as a therapeutic.

Penicillin has heretofore been produced by growing a penicillin-forming mold, especially *Penicillium notatum*, on the surface of a liquid nutrient medium. More recently, the mold has been grown in submerged culture, i. e., by incubating the mold while it is submerged in a liquid nutrient medium and the latter is aerated, by agitation or other suitable means; which method is obviously better adapted for the large-scale commercial production of penicillin.

Liquid nutrient media of various compositions have been employed heretofore in the production of penicillin by mold growth, the media generally comprising nutrient salts and carbohydrate assimilable by the mold. In the production of penicillin by submerged culture, it has been found that the inclusion of a complex organic mixture of nitrogenous substances—especially corn steep liquor—increases the efficiency of penicillin production by causing a more rapid growth of the mold, higher titers, and attainment of maximum penicillin production in a shorter time. The use of such complex mixture, however, is attended by a number of disadvantages arising from the lack of uniformity in the composition of mixtures from different batches and sources; thus, the lack of uniformity introduces obviously undesirable variations in the penicillin content of the culture filtrate, and the heterogeneity and complexity of the components of such mixtures give rise to difficulties in the extraction and concentration of the penicillin. "Synthetic" liquid nutrient media (i. e., liquid nutrient media prepared only with ingredients of known, controllable, and reproducible composition) may be employed, but production therewith has been inefficient.

It is the object of this invention to provide improved methods of and media for producing penicillin by mold growth, especially by submerged culture; and it is an additional object of this invention to provide methods of and media for efficiently producing penicillin by mold growth utilizing synthetic liquid nutrient media.

It has been found that the inclusion of an inorganic, water-soluble sulfite-type compound in the liquid nutrient medium greatly increases the efficiency of penicillin production, and that the inclusion of such compound obviates the use of corn steep liquor (or other complex organic mixture of nitrogenous substances) with its attendant disadvantages. Thus, if an inorganic, water-soluble sulfite-type compound is included in place of the corn steep liquor (and especially if dextrose or other pure substance is used as the source of carbohydrate) an efficient liquid nutrient medium is obtained which is wholly synthetic.

The term "sulfite-type compound," as employed herein, has reference to the genus composed of compounds embodying a sulfite radical and compounds capable of decomposition into compounds embodying a sulfite radical. This genus is represented by the sulfites, bisulfites, metabisulfites, hyposulfites (i. e., salts of hyposulfurous acid), and thiosulfates; and it includes, inter alia, sodium sulfite, potassium sulfite, ammonium sulfite, magnesium sulfite, calcium bisulfite, sodium metabisulfite, sodium hyposulfite, sodium thiosulfate, and sodium bisulfite. The sulfite (and/or bisulfite) may be formed in situ by adding sulfurous acid or by passing $SO_2$ into the medium; and industrial by-products rich in inorganic, water-soluble sulfite-type compounds, such as sulfite waste liquor, may be employed (not, however, conferring the advantages of a wholly synthetic medium).

Though certain batches of corn steep liquor and other complex organic mixtures of nitrogenous substances may contain a minute proportion of an inorganic, water-soluble sulfite-type compound, their use for the purpose of including an inorganic, water-soluble sulfite-type compound in the medium would require pretesting of each batch and is therefore out of the question.

Desirably, the amount of inorganic, water-soluble sulfite-type compound included in the medium is that theoretically capable of yielding a proportion of sulfite radical to medium of about 0.02% to about 0.65%, preferably about 0.033–0.4%, and for optimum results (especially when 2% sugar is included) about 0.065–0.2%.

Using the improved media and incubation methods of this invention, highly-potent, non-toxic, sodium-penicillin preparations, for example, may be obtained by the following general procedure:

A liquid nutrient medium in which has been included an inorganic, water-soluble sulfite-type compound is sterilized (in the usual manner), inoculated with (spores of) a selected strain of the mold *Penicillium notatum*, and incubated until substantially maximum penicillin production has been attained; and the culture medium is filtered, the filtrate is acidified and extracted with amyl acetate in the cold, the amyl acetate solution is extracted with a pH 6.5 phosphate-buffer solution, the buffer solution is cooled, acidified, and extracted with chloroform, the chloroform solution is extracted with a pH 6.0 phosphate-buffer solution, and the cooled buffer solution is acidified and then extracted with ether, and the ether solution is extracted with sodium bicarbonate solution. The resulting solution of sodium-penicillin is frozen and subjected to a high vacuum to sublime out the water.

The following examples are illustrative of the invention (the potency unit referred to being the Florey, or Oxford, unit used in the United States of America for standardizing therapeutic penicillin preparations):

Example 1

150 cc. portions of a medium of the following formula:

| | |
|---|---|
| $NaNO_3$ | g-- 6 |
| $KH_2PO_4$ | g-- 1.5 |
| $MgSO_4 \cdot 7H_2O$ | g-- 0.5 |
| $CaCO_3$ | g-- 5 |
| Brown sugar | g-- 10 |
| $Na_2SO_3$ | g-- 1 |
| Tap water | liter-- 1 | are distributed in 500 cc. flasks and sterilized, an inoculum of *Penicillium notatum* is added to each flask, and the medium is incubated at 75° F. while agitating continuously by means of a shaking machine. A maximum potency of 12 units/ml. is developed in 4 days, the pH of the culture filtrate being 8.0. (With the sodium sulfite omitted from this formula, and under the same conditions, a maximum potency of 4.6 units/ml. is developed in 4 days, the pH of the culture filtrate being 7.8.)

Example 2

With the sodium sulfite in the formula of Example 1 increased to 2 g., and under the same conditions, the same maximum potency is developed in the same time, but the pH of the culture filtrate is 9+.

Example 3

Employing a medium of the following formula:

| | |
|---|---|
| $KH_2PO_4$ | g-- 1.5 |
| $MgSO_4 \cdot 7H_2O$ | g-- 0.5 |
| Ammonium tartrate | g-- 6 |
| Glucose | g-- 20 |
| $CaCO_3$ | g-- 5.0 |
| $FeSO_4 \cdot 7H_2O$ | trace |
| $Na_2SO_3$ | g-- 1.5 |
| Distilled water | liter-- 1 | in place of the medium in Example 1, and under the same conditions, a maximum potency of 24 units/ml. is developed in 6 days, the pH of the culture filtrate being 7.6. (Production of penicillin in this "synthetic" medium compares favorably with that in a regular deep-culture medium containing corn steep liquor which has incubated under the same conditions.)

Example 4

With the sodium sulfite and brown sugar in the formula of Example 1 respectively increased to 1.5 g. and 20 g., and under the same conditions, a maximum potency of 48 units/ml. is developed in 6 days, the pH of the culture filtrate being 8.5.

Example 5

With the sodium sulfite in the formula of Example 1 increased to 1.5 g., and 20 g. glucose included in place of the brown sugar, and under the same conditions, a maximum potency of 36 units/ml. is developed in 6 days, the pH of the culture filtrate being 8.8. (An improvement in rate of penicillin production may be obtained by replacing the sodium nitrate in the formula with about 6-12 g. potassium nitrate; thus, with the same formula but including 6 g. potassium nitrate in place of the sodium nitrate, and under the same conditions, a maximum potency of 36 units/ml. is developed in 4 days, the pH of the culture filtrate being 8.2.)

Example 6

Ten gallons of a tap-water medium made up with the following percentages of ingredients:

| | |
|---|---|
| $Na_2SO_3$ | 0.15 |
| $KH_2PO_4$ | 0.15 |
| $MgSO_4 \cdot 7H_2O$ | 0.05 |
| $NaNO_3$ | 0.6 |
| $CaCO_3$ | 0.5 |
| Brown sugar | 2.0 | is placed in a tank and sterilized, an inoculum of *Penicillium notatum* is added, and the medium is incubated at 25-26° C. while maintained under an air pressure of about 7 lbs., with air passing into the medium through a sparger. The tank is harvested after 3 days' incubation, the culture filtrate obtained having a potency of 12 units/ml.

Example 7

Employing a tap-water medium made up with the following percentages of ingredients:

| | |
|---|---|
| $Na_2SO_3$ | 0.2 |
| $KH_2PO_4$ | 0.2 |
| $MgSO_4 \cdot 7H_2O$ | 0.1 |
| $NaNO_3$ | 0.6 |
| $CaCO_3$ | 0.5 |
| Brown sugar | 2.0 | in place of the medium in Example 6, and under the same conditions, a maximum potency of 12 units/ml. is developed in 5 days, the pH of the culture filtrate being 8.3. The sodium-penicillin obtained from this filtrate in the manner detailed hereinbefore is a light-yellow, fluffy, non-hygroscopic powder having a potency of 258 units/mg.

Example 8

Employing a tap-water medium made up with the following percentages of ingredients:

| | |
|---|---|
| $NaNO_3$ | 0.6 |
| $KH_2PO_4$ | 0.15 |
| $MgSO_4 \cdot 7H_2O$ | 0.05 |
| $CaCO_3$ | 0.5 |
| Corn steep liquor | 3.0 |
| Brown sugar | 1.0 |
| $Na_2SO_3$ | 0.1 | in place of the medium in Example 1, and under the same conditions, a maximum potency of 44 units/ml. is developed in 5 days, the pH of the culture filtrate being 8.1. (With the sodium sulfite omitted from this formula, and under the same conditions, a maximum potency of 36 units/ml. is developed in 5 days, the pH of the culture filtrate being 7.6.)

Example 9

Employing a medium of the following formula:

| | |
|---|---|
| $KH_2PO_4$ | g-- 1.5 |
| $MgSO_4 \cdot 7H_2O$ | g-- 0.5 |
| $NaNO_3$ | g-- 6.0 |
| $CaCO_3$ | g-- 5.0 |
| Glucose | g-- 20.0 |
| $Na_2SO_3$ | g-- 3.0 |
| Tap water | liter-- 1 | in place of the medium in Example 1, and under the same conditions, a maximum potency of 24 units/ml. is developed in 3 days, the pH of the culture filtrate being 8.0. (With the sodium sulfite omitted from this formula, and under the same conditions, a maximum potency of 12 units/ml. is developed in 5 days, the pH of the culture filtrate being 7.8. With the sodium sulfite in this formula reduced to 0.5 g., and under the same conditions, a maximum potency of 20 units/ml. is developed in 5 days, the pH of the culture filtrate being 8.0; and with the sodium sulfite in this formula increased to 6.0 g., and under the same conditions, there is no change in the maximum potency or time of development, but the pH of the culture filtrate is 9+.)

*Example 10*

With the brown sugar in the formula of Example 1 increased to 20 g., and the sodium sulfite replaced by 2 g. sodium thiosulfate, and under the same conditions, a satisfactory yield of penicillin is obtained.

*Example 11*

Employing a medium of the following formula:

| | |
|---|---|
| $NaNO_3$ | g.. 6 |
| $KH_2PO_4$ | g.. 1.5 |
| $MgSO_4 \cdot 7H_2O$ | g.. 0.5 |
| Brown sugar | g.. 20 |
| $Na_2S_2O_3 \cdot 5H_2O$ | g.. 4 |
| Tap water | liter.. 1 | in place of the medium in Example 1, and under the same conditions, a potency of 24 units/ml. is developed in 4 days. This medium, incidentally, has the possible advantage of being perfectly clear.

*Example 12*

Employing a tap-water medium made up with the following percentages of ingredients:

| | |
|---|---|
| $MgSO_4 \cdot 7H_2O$ | 0.05 |
| $KNO_3$ | 0.6 |
| $Na_2SO_3$ | 0.2 |
| Brown sugar | 2.0 |
| $Ca_3(PO_4)_2$ | 0.5 | in place of the medium in Example 1, and under the same conditions, a potency of 24 units/ml. is developed in 5 days.

*Example 13*

With the brown sugar in the formula of Example 1 increased to 20 g., and the sodium sulfite replaced by 1 g. (or 3 g.) sodium metabisulfite, and under the same conditions, a satisfactory yield of penicillin is obtained.

*Example 14*

Employing a medium of the following formula:

| | |
|---|---|
| $NaNO_3$ | g.. 6 |
| $KH_2PO_4$ | g.. 1.5 |
| $MgSO_4 \cdot 7H_2O$ | g.. 0.5 |
| $CaCO_3$ | g.. 5 |
| Glucose | g.. 20 |
| $Na_2SO_3$ | g.. 2 |
| $ZnSO_4 \cdot 7H_2O$ | g.. .001 |
| $FeSO_4 \cdot 7H_2O$ | trace |
| Distilled water | liter.. 1 | in place of the medium in Example 1, and under the same conditions, a satisfactory yield of penicillin is obtained.

*Example 15*

The following ingredients:

| | Pounds |
|---|---|
| $KH_2PO_4$ | 8.8 |
| $MgSO_4 \cdot 7H_2O$ | 2.9 |
| $NaNO_3$ | 35 |
| $Na_2SO_3$ | 11.7 |
| Brown sugar | 117 |
| $CaCO_3$ | 29 | are dissolved in 700 gals. tap water in a 1200-gal. tank equipped with a stirrer and a sparger for introduction of air, 100 gals. water is added; the medium is sterilized; an inoculum of *Penicillium notatum* is added; and the medium is incubated at 25–26° C. while maintained under an air pressure of about 15 lbs., with air passing into the medium through the sparger. The tank is harvested after 6½ days incubation, the culture filtrate obtained having a potency of 36 units/ml.

In the production of sodium-penicillin from this culture filtrate in the manner detailed hereinbefore, the emulsion resulting on extraction with amyl acetate is easier to resolve than the corresponding emulsion formed where corn steep liquor has been included in the medium, and the product (sodium-penicillin) dries in a different manner, yielding a fluffier and lighter powder.

This sodium-penicillin has been further purified, and obtained in pure crystalline form. Its formula, $C_{14}H_{19}O_4N_2SNa$, and rotation, +290° (in water at 23° C.) differ from that of the pure crystalline sodium-penicillin described in Wintersteiner and MacPhillamy application Serial No. 497,719, filed August 6, 1943 and now abandoned (which was derived from the prior corn-steep-liquor containing submerged-culture media); but the different products have approximately the same antibacterial potency.

The proportion of each of the ingredients included in the media of the foregoing examples may be varied considerably without sacrificing all of the advantage gained by inclusion of an inorganic, water-soluble sulfite-type compound. Thus, variations of the $NaNO_3$ included from about 0.3% to about 2.4%, of the $CaCO_3$ included from about 0.1% to about 2%, of the $MgSO_4 \cdot 7H_2O$ included from 0.05% to 0.2%, and of the brown sugar included from 1% to 6%, have been determined to be feasible (these, of course, not representing the limits of the operative ranges); also more concentrated media, e. g., one having twice the concentration of the medium described in Example 4, may be employed.

The potassium, phosphorus, magnesium, calcium, and nitrogen supplied by the nutrient salts may, of course, be supplied by salts other than those specifically named hereinbefore; and one or more of the (nutrient) metals may be supplied in whole or part by selection of the appropriate inorganic, water-soluble, sulfite-type compound, inter alia, magnesium sulfite and potassium sulfite.

The media utilizable in the practice of this invention may include (in addition to or in place of ingredients mentioned hereinbefore) one or more of the following, inter alia; urea, glycerol, molasses, sucrose, starch, and various other pure or impure carbohydrates, soy-bean-cake meal, cottonseed meal, yeast extract, wheat germ, whiskey slop, casein hydrolysate, tryptone, beef-heart-infusion broth, and *Penicillium* autolysate. Preferably, the ingredients selected are those which will provide wholly synthetic media.

The production of penicillin by submerged culture in the synthetic liquid nutrient media of this invention is enhanced by the inclusion of a trace to about 0.01% of zinc sulfate (or equivalent amount of other zinc salt). Also, if a wholly synthetic liquid nutrient medium is made with distilled water and a pure carbohydrate, a trace of iron (desirably in the form of ferrous sulfate) should be included.

The methods and media of this invention are utilizable for the production of penicillin or related antibiotics by the growth of (suitable strains) of antibiotic-forming molds other than *Penicillium notatum*, inter alia *Penicillium chrysogenum* and *Aspergillus flavus*; and the term "penicillin," as generically employed in the claims, is accordingly to be understood as embracing such related antibiotics.

The invention may be variously otherwise embodied within the scope of the appended claims.

I claim:

1. The method of producing penicillin which comprises inoculating with a penicillin-forming mold a synthetic liquid nutrient medium essentially including nutrient salts, a carbohydrate assimilable by the mold and a member of the group consisting of inorganic, water-soluble sulfites, bisulfites, metabisulfites, hyposulfites, and thiosulfates, the last ingredient being included in amount capable of yielding a proportion of sulfite radical to medium of about 0.02% to about 0.65%, and incubating the inoculated medium.

2. The method of producing penicillin which comprises inoculating with a penicillin-forming mold a synthetic liquid nutrient medium including an ingredient of the group consisting of inorganic, water-soluble sulfites, bisulfites, metabisulfites, hyposulfites, and thiosulfates, which ingredient is included in amount capable of yielding a proportion of sulfite radical to medium of about 0.02% to about 0.65%, and incubating the inoculated medium.

3. The method of producing penicillin which comprises growing a penicillin-forming mold in submerged culture in a synthetic liquid nutrient medium including an ingredient of the group consisting of inorganic, water-soluble sulfites, bisulfites, metabisulfites, hyposulfites, and thiosulfates, which ingredient is included in amount capable of yielding a proportion of sulfite radical to medium of about 0.02% to about 0.65%.

4. The method of producing penicillin which comprises growing a penicillin-forming mold in submerged culture in a synthetic liquid nutrient medium including an amount of sodium sulfite capable of yielding a proportion of sulfite radical to medium of about 0.02% to about 0.65%.

ROBERT B. McCORMACK.

REFERENCES CITED

The following references are of record in the file of this patent:

UNITED STATES PATENTS

| Number | Name | Date |
| --- | --- | --- |
| 1,044,615 | Willcox | Nov. 19, 1912 |
| 1,582,408 | Legg | Apr. 27, 1926 |
| 2,179,203 | Stein | Nov. 7, 1939 |
| 2,346,011 | Damm | Apr. 4, 1944 |

OTHER REFERENCES

Foster et al.: "Jr. of Bacteriology," Nov. 1943, page 433.

Summary of discussion at the Penicillin Technical Meeting, New York, January 21–22, 1944, page 7.

Chemical Abstracts: 36:613 (3), (1942).